(12) United States Patent
Osada et al.

(10) Patent No.: US 7,804,220 B2
(45) Date of Patent: Sep. 28, 2010

(54) DIRECT CRANKING ELECTRIC ROTARY MACHINE FOR VEHICLE

(75) Inventors: Masahiko Osada, Okazaki (JP);
Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 359 days.

(21) Appl. No.: 11/783,560

(22) Filed: Apr. 10, 2007

(65) Prior Publication Data

US 2007/0252472 A1    Nov. 1, 2007

(30) Foreign Application Priority Data

May 1, 2006    (JP)    .............................. 2006-127500

(51) Int. Cl.
*H02K 1/22*    (2006.01)
(52) U.S. Cl. ............................ 310/268; 310/76; 310/74; 310/77; 310/78; 310/41
(58) Field of Classification Search ................... 310/41, 310/166, 162, 74, 76, 268; 74/6
See application file for complete search history.

(56) References Cited

U.S. PATENT DOCUMENTS

| 4,733,119 | A | * | 3/1988 | Shiraki et al. | ............... | 310/268 |
| 5,384,506 | A | * | 1/1995 | Aoshima | .................. | 310/49.11 |
| 6,541,891 | B2 | * | 4/2003 | Yamaguchi | .................. | 310/268 |
| 6,699,081 | B1 | * | 3/2004 | Divljakovic et al. | ............ | 440/1 |
| 7,091,636 | B2 | * | 8/2006 | Ohno | ........................ | 310/67 R |
| 7,173,357 | B2 | * | 2/2007 | Naito et al. | ............ | 310/154.05 |
| 7,259,484 | B2 | * | 8/2007 | Hosono | ........................ | 310/51 |
| 2002/0093260 | A1 | * | 7/2002 | Yamaguchi | .................. | 310/81 |
| 2005/0023923 | A1 | * | 2/2005 | Chu et al. | .................... | 310/211 |
| 2005/0258697 | A1 | * | 11/2005 | Ohno | .................... | 310/156.32 |
| 2006/0049703 | A1 | * | 3/2006 | Hosono et al. | ............ | 310/68 B |
| 2006/0103263 | A1 | * | 5/2006 | Naito et al. | .................. | 310/268 |

FOREIGN PATENT DOCUMENTS

JP    A-11-078555    3/1999
JP    A-2004-222384    8/2004

* cited by examiner

*Primary Examiner*—Quyen Leung
*Assistant Examiner*—Terrance Kenerly
(74) *Attorney, Agent, or Firm*—Oliff & Berrige, PLC

(57) ABSTRACT

In a direct cranking electric rotary machine as an axial air-gap motor having an improved configuration mounted on a vehicle, a stator is faced to an end part on a surface of a rotor. The rotor also acts as a flywheel for an engine mounted on the vehicle. The length of a circumference of the stator is limited below 180 deg. of its entire circumference. This configuration enables a repair man to easily detach and repair components forming the direct cranking electric rotary machine.

9 Claims, 5 Drawing Sheets

FRONT ← → REAR

FRONT ← → REAR

DIRECT CRANKING ELECTRIC ROTARY MACHINE FOR VEHICLE

CROSS-REFERENCE TO RELATED APPLICATION

This application is related to and claims priority from Japanese Patent Application No. 2006-127500 filed on May 1, 2006, the contents of which are hereby incorporated by reference.

BACKGROUND OF THE INVENTION

1. Field of the Invention

The present invention relates to a direct cranking electric rotary machine to be mounted on a vehicle.

2. Description of the Related Art

A direct cranking electric rotary machine for a vehicle has been widely known. Such a direct cranking electric rotary machine is used for starting an internal combustion engine mounted on a vehicle, assisting the torque of the engine, and generating electric power to be supplied to various types of electrical loads mounted on the vehicle. Japanese patent laid open publication No. JP H11-078555 has disclosed such a direct cranking electric rotary machine. A rotor in the direct cranking electric rotary machine also acts as a flywheel for the internal combustion engine mounted on the vehicle However, such a direct cranking electric rotary machine makes repair and examination work much more difficult because of being always placed between the internal combustion engine and a power transmission system such as a clutch device and a transmission device. Further, because the rotation speed of the internal combustion engine of a vehicle is low at starting and a large torque is required, it is necessary to incorporate a direct cranking electric rotary machine acting as a flywheel of a large diameter into the vehicle in order to output high power energy. However, the increase of the diameter of the flywheel increases its weight, namely the weight of the direct cranking electric rotary machine. Increasing the weight of the direct cranking electric rotary machine is not practical in use.

SUMMARY OF THE INVENTION

It is an object of the present invention to provide a direct cranking electric rotary machine of being a compact size and light weight which is easily examined and repaired.

To achieve the above purposes, the present invention provides a direct cranking electric rotary machine for a vehicle having a rotor and a stator. The rotor is fixed to a crankshaft of an engine mounted on the vehicle. The rotor acts as a flywheel. The stator has an axial air-gap motor construction and faces to an end surface of not more than a half circumference of the rotor. In the direct cranking electric rotary machine of the present invention having the above configuration, the stator faces to the rotor of not more than a half of the entire circumference of the rotor. This configuration enables a repair man to easily detach the stator to the outside in the diameter direction and to attach the stator to the inside of the direct cranking electric rotary machine in the diameter direction. The repair man can detach, examine, and repair the components of the direct cranking electric rotary machine while keeping the assembled state of the rotor acting as a flywheel with the engine of the vehicle and a power transmission mechanism. Further, because the stator is not faced to the entire circumference of the rotor acting as the flywheel, it is possible to reduce the entire weight and volume of the direct cranking electric rotary machine. Still further, because the direct cranking electric rotary machine takes the axial air gap motor structure, the stator does not protrude to the outside of the rotor having the flywheel function. This configuration can provide a compact size direct cranking electric rotary machine.

In the direct cranking electric rotary machine as another aspect of the present invention, the stator is composed of plural stator parts and each stator part faces to a different end part on a surface of the rotor. This configuration provides the feature in which the entire of the stator composed of the plural stator parts is faced to the end parts of not less than a half circumference on the surface of the rotor regardless of one stator part being only facing to not more than a half circumference of the surface of the rotor.

In the direct cranking electric rotary machine as another aspect of the present invention, the plural stator parts are placed facing to the end parts on both the surfaces of the rotor. It is thereby possible to increase the output voltage of the direct cranking electric rotary machine while keeping its easy detaching function.

In the direct cranking electric rotary machine as another aspect of the present invention, the stator is divided to a primary side stator facing to the end parts on one surface of the rotor and a secondary side stator facing to the end parts on another surface of the rotor, and the primary side stator and the secondary side stator are arranged in different positions to each other, standardized by the positions of magnet poles of the rotor facing to the primary side stator and the secondary side stator.

The phase of a primary current flowing through the stator coil in the primary side stator is determined based on its facing rotor magnet pole. The phase of a secondary current flowing through the stator coil in the secondary side stator is determined based on its facing rotor magnet pole. It is acceptable to set the primary current and the secondary current without the phase difference between them, and to shift the position of the rotor magnet pole facing to the primary side stator from the position of the rotor magnet pole facing to the secondary side stator. More preferably, the stator coil of the primary side stator and the stator coil of the primary side stator are composed of three phase coils of three phase windings separating by an electrical angle $2\Pi/3$ to each other, and the phase winding of the primary side stator and the phase winding of the secondary side stator are separated in position by the electrical angle $\Pi/6$ to each other. It is thereby possible to reduce the torque ripple of the direct cranking electric rotary machine.

In the direct cranking electric rotary machine as another aspect of the present invention, the rotor has a ring gear, which is formed on the outer periphery thereof, to be used for starting the engine of the vehicle, and the ring gear is placed at the position which is different from the stator core in the circumference direction in order to mesh a pinion gear of a starter mounted on the vehicle. It is thereby possible to mount both of the pinion ring gear starter mechanism and the rotor having the flywheel function on the direct cranking electric rotary machine.

In accordance with another aspect of the present invention, the direct cranking electric rotary machine further has a brush and a brush driving mechanism. The brush is slidably contacted to a rectifier placed at an outer circumference of the rotor. The brush driving mechanism switches contact and separation states between the brush and the rectifier. The rotor has an armature coil, contacted to the rectifier, facing to a permanent magnet pole of the stator. It is thereby possible to use a large starting torque of a DC motor. Because the brush is changeable in position even if the rotor speed is increased after starting of the engine, it is possible to avoid the abrasion of the brush and the rectifier.

In the direct cranking electric rotary machine as another aspect of the present invention, the direct cranking electric rotary machine is an induction machine having a squirrel cage secondary winding in the rotor. It is thereby possible to simplify the mechanism of the rotor. Because the synchronous reluctance motor does not have any permanent magnets, which are used in a magnet type synchronous motor or a magnet type DC motor, it is possible to avoid increasing torque loss caused by drug torque between the rotor and the stator during not supplying electric power to the stator coil.

In the direct cranking electric rotary machine as another aspect of the present invention, the direct cranking electric rotary machine is a synchronous reluctance motor whose rotor has magnet protrusion poles. It is thereby possible to simplify the mechanism of the rotor. Because the synchronous reluctance motor does not have any permanent magnets, which are used in a magnet type synchronous motor or a magnet type DC motor, it is possible to avoid the increase of torque loss caused by drug torque between the rotor and the stator during not supplying electric power to the stator coil.

In accordance with another preferred embodiment according to the present invention, there is provided a direct cranking electric rotary machine for a vehicle having a rotor, a stator, a brush, and a brush driving mechanism. The rotor is fixed to a crankshaft of an engine mounted on the vehicle and also acting as a flywheel (having flywheel function). The stator of an axial air-gap motor construction faces to an end part in not more than a half circumference direction on a surface of the rotor. The brush is slidably contacted to a rectifier placed at an outer circumference of the rotor. The brush driving mechanism switches contact and separation states between the brush and the rectifier. In the direct cranking electric rotary machine, the rotor has an armature coil, contacted to the rectifier, facing to a permanent magnet pole of the stator. According to the present invention, because a large starting torque of a DC motor is further increased by the large diameter of the flywheel rotor (the rotor having the flywheel function), it is possible to easily start the engine without using any gear mechanism. It is possible to avoid occurrence of abrasion in the brush and the rectifier after starting, as one of important problems in the use of such a DC motor, by shifting the brush to the outside in the diameter direction by using solenoid, for example.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
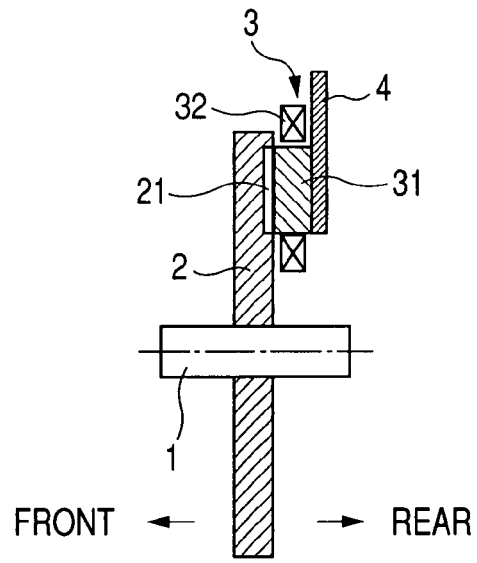
FIG. 1 is a schematically and partially broken side view of a direct cranking electric rotary machine for a vehicle according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the direct cranking electric rotary machine for a vehicle according to a first embodiment of the present invention with reference to FIG. 1 and FIG. 2.

FIG. 1 is a schematically and partially broken side view of the direct cranking electric rotary machine for a vehicle according to the first embodiment. FIG. 2 is a schematic front view of the direct cranking electric rotary machine for a vehicle shown in FIG. 1, observed from a rear side thereof.

Figure 2:
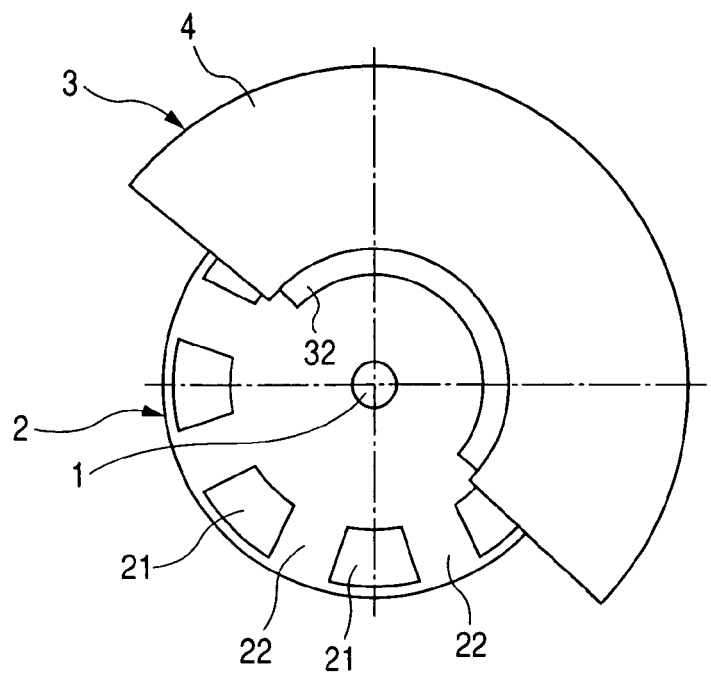
FIG. 2 is a schematic front view of the direct cranking electric rotary machine for a vehicle according to the first embodiment, shown in FIG. 1, observed from a rear side thereof.

In FIG. 1 and FIG. 2, reference character 1 designates a rotary shaft of the electric rotary machine to be mounted on a vehicle, 2 denotes a rotor which also acts as a flywheel, and 3 indicates a stator. The rotor 2 and the stator 3 form a synchronous reluctance motor (SRM).

The rotary shaft 1 is rotatably supported by a housing of a power train (hereinafter, referred to as "a power train housing in short). One end of the rotary shaft 1 is joined to a crankshaft of an internal combustion engine (or an engine in short), and the other end of the rotary shaft 1 is joined to a transmission through a clutch.

The rotor 2 is composed of soft steel disk tightly fitting with or fixed to the rotary shaft 1. Eight concave parts 21 are formed in the outer circumference area at the rear end surface of the rotor 2 at a constant pitch interval in the circumference direction. A magnet protrusion pole 22 is formed between the adjacent concave parts 21 in the circumference direction. The present invention is not limited by the configuration described above, it is acceptable to form the magnet protrusion pole 22 in advance which projects from the surface of the magnet steel plate.

The stator 3 has a stator core 31 of a half circular shape. The stator core 31 of a half circular shape is obtained by cutting a spiral ring-shaped plate which is obtained by spirally laminating a magnet steel plate of a belt shape at the rear end surface of the rotor 2. It is also acceptable to use well-known manners in order to make the stator core 31 of the above shape.

Plural slots (omitted from the drawings) are formed in a diameter direction at the opposite end surface of the stator core 31 faced to the rotor 2. A stator coil 32 as a three-phase coil is wound on each slot.

There are well-known manners of producing those slots, for example, the manner in which the above concave parts are formed at a specified constant pitch along a longitudinal direction of the magnet steel plate of a belt shape in one area of the magnet steel plate of a belt shape before performing the spiral lamination step and then the positions of the concave parts formed in the magnet steel plate of a belt shape are coincided in the spiral laminating step.

It is possible to adopt a distribute winding or a concentrated winding for the stator coil 32. In adopting the distribute winding, 3N slots (N is an integer) are formed per pitch of the magnet protrusion poles of the rotor 2, and a different phase coil is placed in each slot. In the configuration shown in FIG. 2, an electrical angle Π corresponds to an angle of 45 deg. (45°) of the rotor 2. It is thereby possible to generate a rotary vector current which is in synchronization with a revolution of the rotor 2, like a normal three phase AC motor.

A supporting plate 4 made of soft steel of a half circular shape is fixed to the rear end surface of the stator core 31. In the first embodiment, the supporting plate 4 forms a part of the magnetic path of a back yoke because the supporting plate 4 has a soft magnetization.

It is also acceptable to use the supporting plate 4 as the back yoke of the stator core composed only of teeth of a commonly used stator core. Such a stator core forming manner has been well known as stator core assembly manner. Although this manner is useful for a concentrated winding, the supporting plate 4 has a drawback in iron loss or core loss because the supporting plate 4 in the direct cranking stator of the first embodiment is not formed by a laminated magnet steel plate. In the configuration of the first embodiment, the stator core 31 acts as the back yoke magnet path for flowing magnetic flux to the diameter direction. Making the supporting plate 4 by a non-magnetic material further reduces the iron loss.

The supporting plate 4 is fixed to a housing (omitted from the drawings). The above manner can make a synchronous reluctance motor (SRM) composed of the stator 3 of a half circular shape and the rotor of a circular shape. It is also acceptable to make an induction motor by using a squirrel cage coil instead of the magnet protrusion parts 22 in the rotor 2, or to make a switched reluctance motor.

A description will now be given of effects of the direct cranking electric rotary machine for a vehicle having the axial air-gap motor mechanism of a partial cylindrical type described above.

First, the stator 3 is easily detached to the outside and attached into the inside of the electric rotary machine along its diameter direction because the stator 3 is faced to a half (180 deg.) circumference part on the surface of the rotor 2. It is thereby possible to take the direct cranking electric rotary machine apart to components thereof and to repair the stator 3 with new one while the rotor 2 acting the flywheel is fitted to the engine and the power transmission mechanism. Further, the axial air-gap motor mechanism adopted to the direct cranking electric rotary machine of the first embodiment can reduce the outer diameter of the direct cranking electric rotary machine and to suppress increasing the diameter size of the power train of a vehicle. Investigating from the winding of the stator coil 32 into the stator core 31, it is preferred for the stator core 31 to occupy the angle of integer times of the two magnet pole pitch of the rotor, namely, the electrical angle Π.

Second Embodiment

A description will be given of a direct cranking electric rotary machine for a vehicle according to a second embodiment of the present invention with reference to FIG. 3 and FIG. 4.

Figure 3:
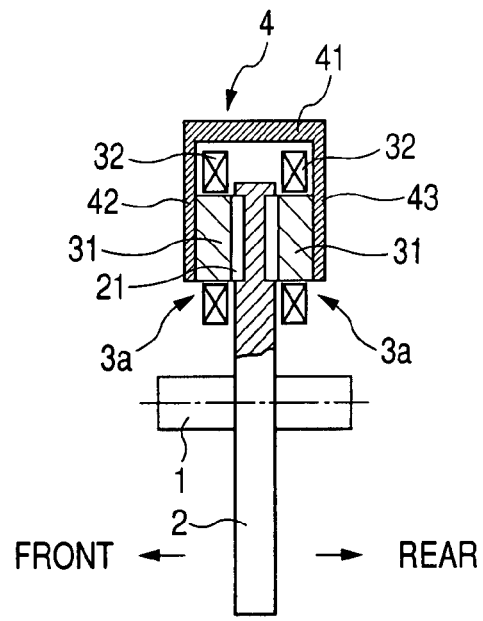
FIG. 3 is a schematically and partially broken side view of a direct cranking electric rotary machine for a vehicle according to a second embodiment of the present invention.

FIG. 3 is a schematically and partially broken side view of the direct cranking electric rotary machine for a vehicle according to a second embodiment of the present invention. FIG. 4 is a schematic front view of the direct cranking electric rotary machine for a vehicle according to the second embodiment, shown in FIG. 3, observed from a rear side thereof.

Figure 4:
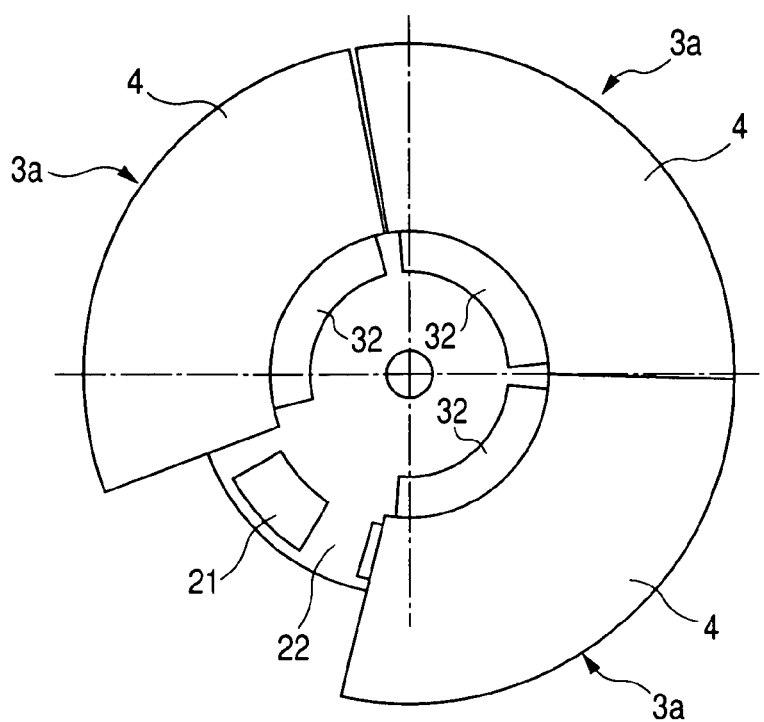
FIG. 4 is a schematic front view of the direct cranking electric rotary machine for a vehicle according to the second embodiment, shown in FIG. 3, observed from a rear side thereof.

The direct cranking electric rotary machine of the second embodiment shown in FIG. 3 and FIG. 4 has a different configuration as compared with that of the first embodiment shown in FIG. 1 and FIG. 2. That is, in the direct cranking electric rotary machine shown in FIG. 3 and FIG. 4, each of three stators 3a has a reduced circumference size when compared with the circumference size of the stator 3 shown in FIG. 1 and FIG. 2. Further, the three stator parts 3a which form the stator 3 are faced in position to end circumference parts on both the surfaces of the rotor 2.

As shown in FIG. 4, the supporting plate 4 has a character "⊐"shaped cross section in the axis direction, and a pair of the stators 3a faced to the front part and the rear part of the rotor 2, respectively, are fixed to a pair of circular-shaped plates 42 and 43 placed at both sides of the rotor 2 and extending from both ends of the cylindrical shaped part 41 of the supporting plate 4 toward the inside of the diameter direction.

The three phase coils forming the stator coil 32 of the stators 3 has the same configuration of that of the first embodiment. Each phase coil is arranged in the order of generating a rotating magnetic field (namely, a rotating vector current) in the entire of the three stator coils 32 adjacent to each other in the circumference direction. This also is the same as that of the first embodiment.

The configuration of the direct cranking electric rotary machine of the second embodiment achieves a large magnitude of the output while keeping the capability for easy decomposition, like the capability of the first embodiment. Further, it is possible to connect the rotor 2 to another rotary machine through a part in the outer circumference area of the rotor 2 which is not faced to the stators 3a.

Third Embodiment

Figure 5:
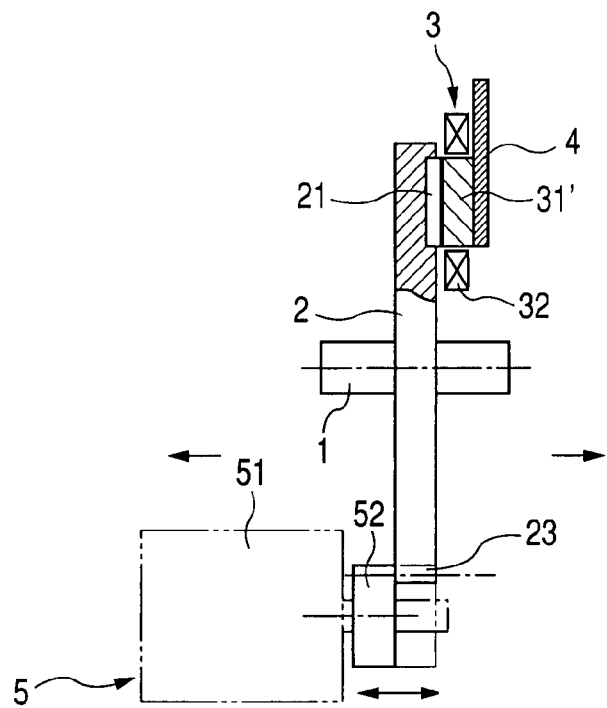
FIG. 5 is a schematically and partially broken side view of a direct cranking electric rotary machine for a vehicle according to a third embodiment of the present invention.
Figure 6:
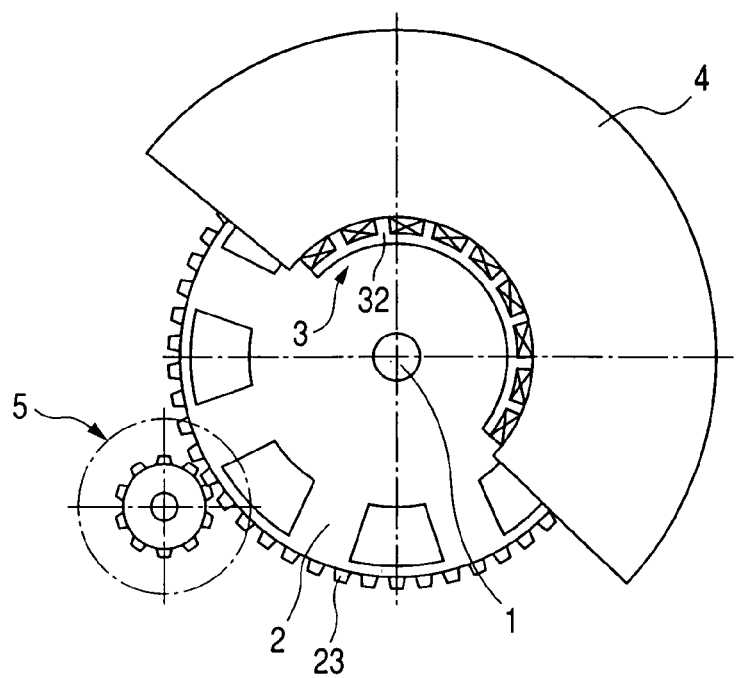
FIG. 6 is a schematic front view of the direct cranking electric rotary machine for a vehicle according to the third embodiment, shown in FIG. 5, observed from a rear side thereof.

A description will be given of a direct cranking electric rotary machine for a vehicle according to a third embodiment of the present invention with reference to FIG. 5 and FIG. 6. FIG. 5 is a schematically and partially broken side view of the direct cranking electric rotary machine for a vehicle according to the third embodiment. FIG. 6 is a schematic front view of the direct cranking electric rotary machine for a vehicle according to the third embodiment, shown in FIG. 5, observed from a rear side thereof.

In the direct cranking electric rotary machine of the third embodiment shown in FIG. 5 and FIG. 6, a link gear 23 is formed on the outer circumference surface and the starter 5 is engaged with the link gear 23. This configuration is obtained by adding the link gear 23 to the configuration of the stator 3 shown in FIG. 1 and FIG. 2.

The above feature of the direct cranking electric rotary machine of the third embodiment shown in FIG. 5 and FIG. 6 will now be explained in detail.

The starter 5 has a starter motor 51 and a pinion 52. The pinion 52 is detachably engaged with the ring gear 23 formed at an outer circumference part on the surface of the rotor 2, which is not faced to the stator 3. At starting of the engine mounted on a vehicle, the starter motor 51 with a speed-reducing mechanism drives the rotor 2 through the pinion 52, and is detached in the axis direction from the ring-gear part 23 after the engine reaches a high rotation speed. It is thereby possible for the direct cranking electric rotary machine of the third embodiment to increase the starting torque of the rotor 2 at the engine start.

Fourth Embodiment

A description will be given of a direct cranking electric rotary machine for a vehicle according to a fourth embodiment of the present invention with reference to FIG. 7 and FIG. 8.

Figure 7:
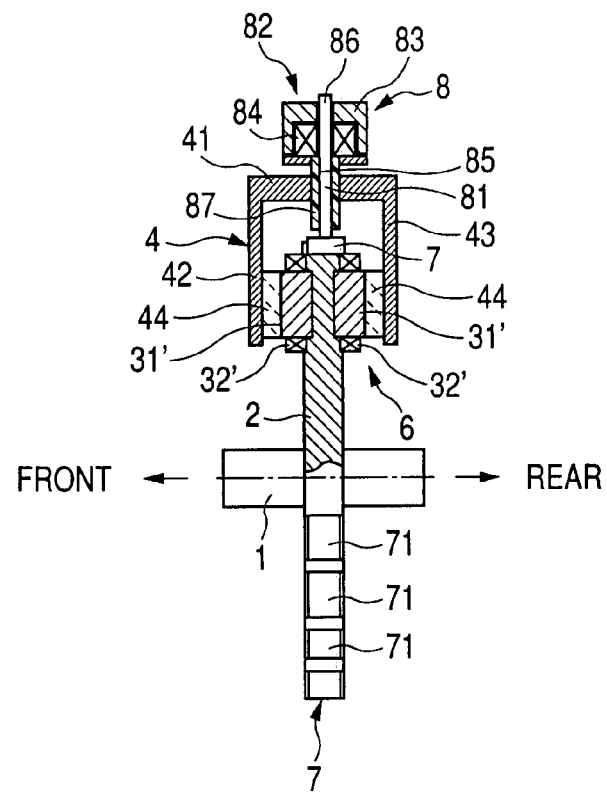
FIG. 7 is a schematically and partially broken side view of a direct cranking electric rotary machine for a vehicle according to a fourth embodiment of the present invention.

FIG. 7 is a schematically and partially broken side view of the direct cranking electric rotary machine for a vehicle according to the fourth embodiment. FIG. 8 is a schematic front view of the direct cranking electric rotary machine for a vehicle according to the fourth embodiment, shown in FIG. 7, observed from a rear side thereof.

Figure 8:
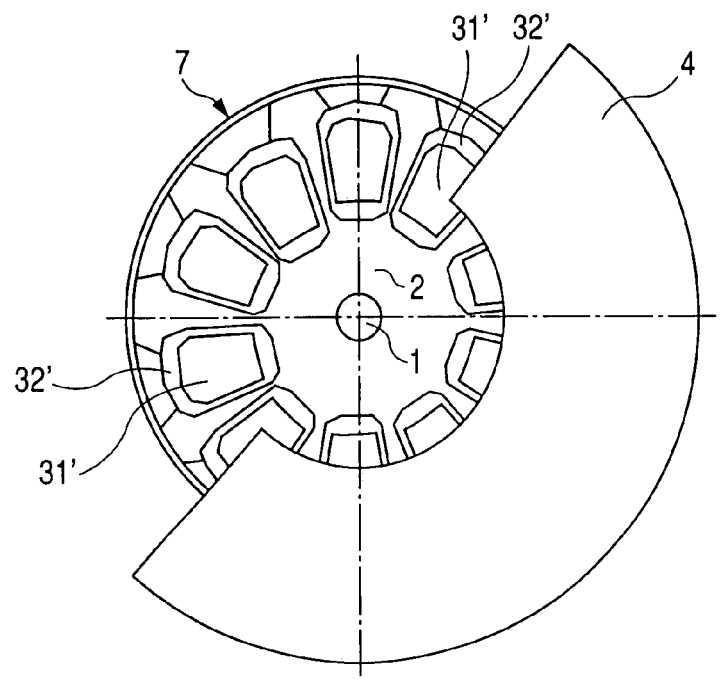
FIG. 8 is a schematic front view of the direct cranking electric rotary machine for a vehicle according to the fourth embodiment, shown in FIG. 7, observed from a rear side thereof.

The electric rotary machine of the fourth embodiment shown in FIG. 7 and FIG. 8 further has a direct current (DC) motor 6, rectifier pieces and a brush assembly for the DC motor. The DC motor 6 is incorporated in the configuration of the stator 3 and the rotor 2.

The configuration of the electric rotary machine of the fourth embodiment will be explained in detail. Like the configuration of the second embodiment shown in FIG. 3, the cross section of the supporting plate 4 in the axis direction has a character "⊐" shape. In addition, the supporting plate 4 is made of soft steel so as to generate a back yoke magnetic path of soft magnetism. Even-number magnetic poles 44 made of permanent magnet are placed on and fixed to the surfaces, faced to the rotor 2, of circular arc shaped plates 42 and 43 forming the supporting plate 4. The supporting plate 4 and the magnet poles 44 form a field winding of the DC motor. It is possible to place a soft magnet member, acting as the back yoke magnet path, between the circular arc plates 42 and 43 and the magnet poles 44.

Teeth 31' formed by laminated magnet steel plates are fixed on both of the end surfaces of the rotor 2 at the corresponding positions to the magnet poles 44. The armature coil 32' is wound on the teeth 31'. The rotor 2 of soft magnetization is made of soft steel. The teeth 31', the armature coil 32' and the rotor 2 form the armature of the DC motor. It is also possible to make the teeth 31' by soft steel and to form the back yoke path by the teeth 31'.

The outer circumference end of each turn of the armature coil 32' is sequentially fixed to each rectifier piece 71 of the rectifier 7. The axial air-gap DC motor is thereby made.

The brush assembly 8 is composed of a brush 81 and a solenoid 82. The inner end of the brush 81 extending in the diameter direction is slidably contacted to the rectifier 7. The solenoid 82 changes the position of the brush 81 toward the diameter direction. Reference 83 designates a stationary yoke of the solenoid 82, 84 denotes a coil of the solenoid 82, 85 indicates a movable iron piece of the solenoid 82, and 86 designates a plunger of a soft magnetism of the solenoid 82. Because the construction and action of the solenoid 82 is well known, the explanation of the solenoid is omitted here for brevity.

The brush 81 is accommodated movably in the diameter direction in a non-magnetic sleeve 87 supported by the supporting plate 4.

The outer end of the brush 81 in the diameter direction is fixed to the inside end of the plunger 86 in the diameter direction. The plunger 86 is forcedly pushed toward the rectifier 7 by a spring omitted from the drawings while not supplying electric power to the coil 84. When the electric power is supplied to the coil 84, the movable iron piece 85 is electrically and magnetically attracted to the stationary yoke 83 and the brush 81 is thereby pushed toward the outside of the diameter direction. The brush 81 is thereby separated from the rectifier 7. It is acceptable to take a reversed operation of the brush 81.

It is thereby possible to start the internal combustion engine mounted on the vehicle without incorporating any speed reducing gear mechanism composed mainly of a DC motor of a large starting torque and a large-diameter rotor.

Fifth Embodiment

A description will be given of a direct cranking electric rotary machine for a vehicle according to a fifth embodiment of the present invention with reference to FIG. 9 and FIG. 10.

Figure 9:
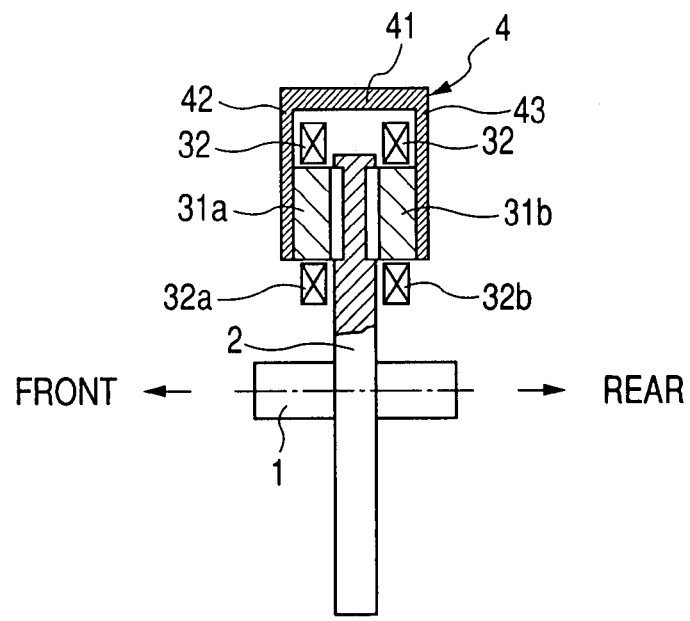
FIG. 9 is a schematically and partially broken side view of a direct cranking electric rotary machine for a vehicle according to a fifth embodiment of the present invention.

FIG. 9 is a schematically and partially broken side view of the direct cranking electric rotary machine for a vehicle according to the fifth embodiment. FIG. 10 is a schematic front view of the direct cranking electric rotary machine for a vehicle according to the fifth embodiment, shown in FIG. 9, observed from a rear side thereof.

Figure 10:
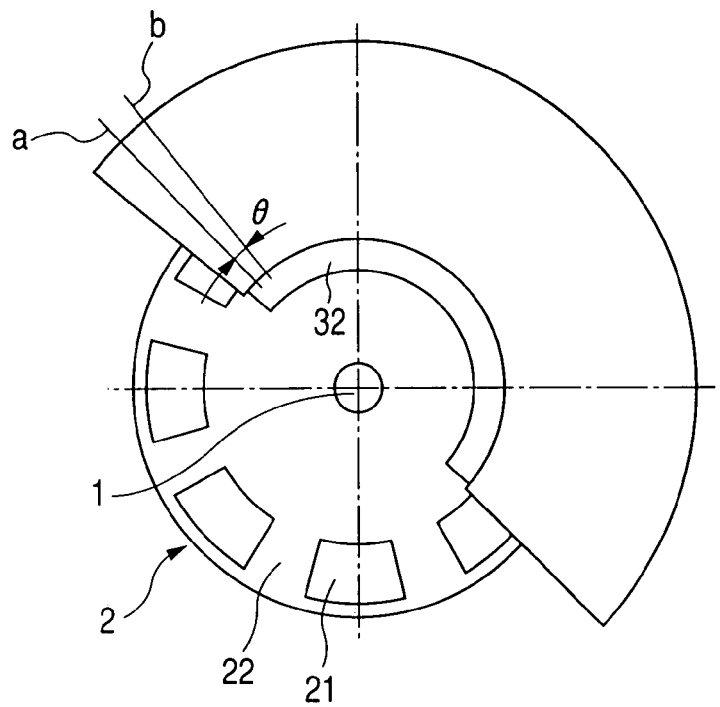
FIG. 10 is a schematic front view of the direct cranking electric rotary machine for a vehicle according to the fifth embodiment, shown in FIG. 9, observed from a rear side thereof.

The direct cranking electric rotary machine of the fifth embodiment shown in FIG. 9 and FIG. 10 has a circular-arc shaped stator 3, a stator core 31, and a stator coil. The circular-arc shaped stator 3 is used instead of the stators 3a assembled in the configuration of the second embodiment shown in FIG. 3 and FIG. 4. The stator core is composed of a front side stator core 31a and a rear side stator core 31b. The stator coil 32 is composed of a front side stator coil 32a and a rear side stator coil 32b. In the direct cranking electric rotary machine of the fifth embodiment shown in FIG. 9 and FIG. 10, in particular, the front side stator coil 32a is shifted in position by a specified phase difference in the circumference direction to the rear side stator coil 32b. In the configuration of the fifth embodiment, a current of a necessary phase difference from the position of each magnet pole of the rotor 2 (the position of the magnet protrusion pole 22 in the circumference direction) is supplied to the front side stator coil 32a, and a current of a necessary phase difference from the position of each magnet pole of the rotor 2 is also supplied to the rear side stator coil 32b.

Although the above configuration of the fifth embodiment shown in FIG. 9 and FIG. 10 is so designed that the magnet protrusion poles 22 formed in the circumference direction and on the front side and the rear side of the rotor 2 are correctly faced in position to each other, it is acceptable to shift those positions of the magnet protrusion poles 22 along the circumference direction.

In the configuration shown in FIG. 10, the center position "a" of a U phase coil of the front side stator coil 32a in the circumference direction and the center position "b" of a U phase coil of the rear side stator coil 32b have a phase difference space to each other corresponding to an angle θ.

This configuration enables the direct cranking electric rotary machine to increase the output torque and to reduce a torque ripple.

Further, in order to have the same effect as described above, it is possible to coincide the positions of the front side stator coil 32*a* and the rear side stator coil 32*b* in the circumference direction to each other and to shift the magnet protrusion pole 22 at the front side of the rotor 2 from the magnet protrusion pole 22 at the rear side of the rotor 2 in the circumference direction.

For various preferred embodiments of the direct cranking electric rotary machine according to the present invention, it is better to use the angle θ=30° when the front side stator coil 32*a* and the rear side stator coil 32*b* are made by three phase coils.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A direct cranking electric rotary machine for a vehicle comprising:
    a rotor fixed to a crankshaft of an engine mounted on the vehicle and serving as a flywheel, and magnet protrusion poles being formed on a first surface of the rotor; and
    a stator of an axial air-gap structure placed at an end part of not more than a half circumference on the first surface of the rotor through an air gap, so that a surface of the stator faces the first surface of the rotor through the air gap.

2. The direct cranking electric rotary machine according to claim 1, wherein the stator is composed of a plurality of stator parts, and each of the stator parts is placed at a different end part on the corresponding first surface of the rotor.

3. The direct cranking electric rotary machine according to claim 2, wherein the plurality of stator parts of the stator are placed to face the end parts on both of the surfaces of the rotor.

4. The direct cranking electric rotary machine according to claim 2, wherein the stator parts are divided into a primary side stator facing the end part on one surface of the rotor, and a secondary side stator facing the end part on the other surface of the rotor, and
    the primary side stator and the secondary side stator are arranged in different positions, standardized by positions of magnet poles of the rotor facing to the primary side stator and the secondary side stator.

5. The direct cranking electric rotary machine according to claim 1, wherein the rotor has a link gear formed on the outer periphery side of the rotor, to be used for starting the engine, and the link gear is placed at a position which is different from a position of a stator core in the circumference direction so that the gear is engaged with a pinion gear of a starter mounted on the vehicle.

6. The direct cranking electric rotary machine according to claim 1, further comprising:
    a brush slideably contacted to a rectifier placed at an outer circumference of the rotor; and
    a brush driving mechanism switching contact and separation states between the brush and the rectifier,
    wherein the rotor has an armature coil, contacted to the rectifier, facing to a permanent magnet pole of the stator.

7. The direct cranking electric rotary machine according to claim 1, wherein the direct cranking electric rotary machine is an induction machine having a squirrel cage secondary winding in the rotor.

8. The direct cranking electric rotary machine according to claim 1, wherein the direct cranking electric rotary machine is a synchronous reluctance motor whose rotor has magnet protrusion poles.

9. A direct cranking electric rotary machine for a vehicle comprising:
    a rotor fixed to a crankshaft of an engine mounted on the vehicle and serving as a flywheel; and
    a stator of an axial air-gap structure placed at an end part of not more than a half circumference on a surface in an axial direction of the rotor through an air gap.

* * * * *